Feb. 17, 1925.
L. E. SCHUBERT
MEANS OF MEASURING DISTANCES AND ALTITUDES
Filed April 17, 1922   3 Sheets-Sheet 1
1,527,086
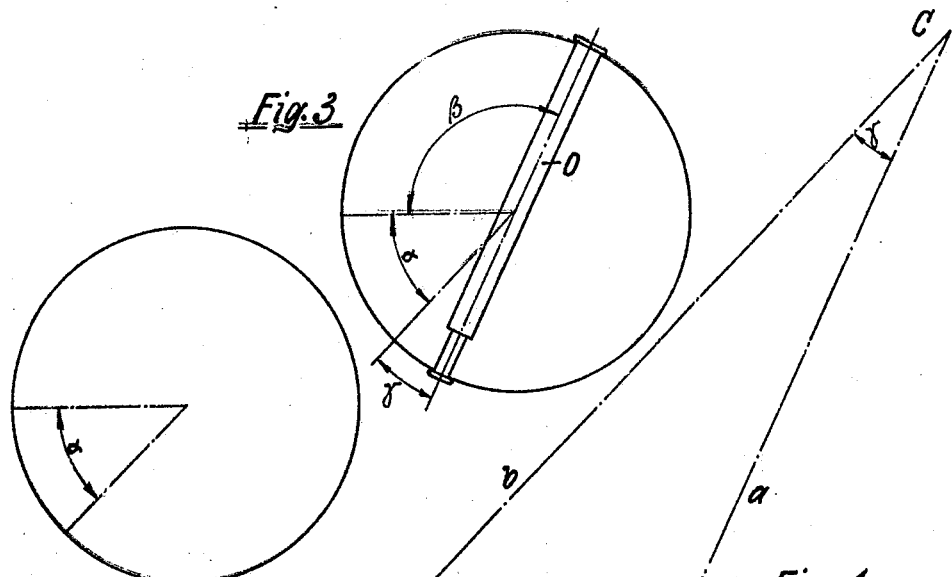
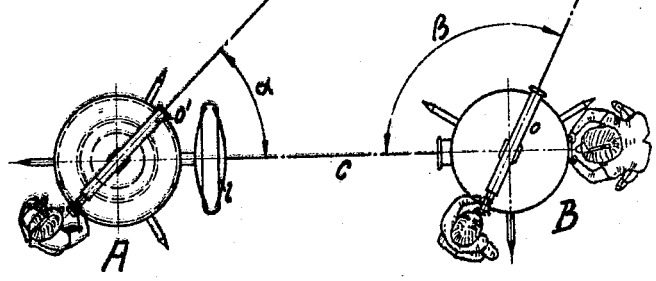
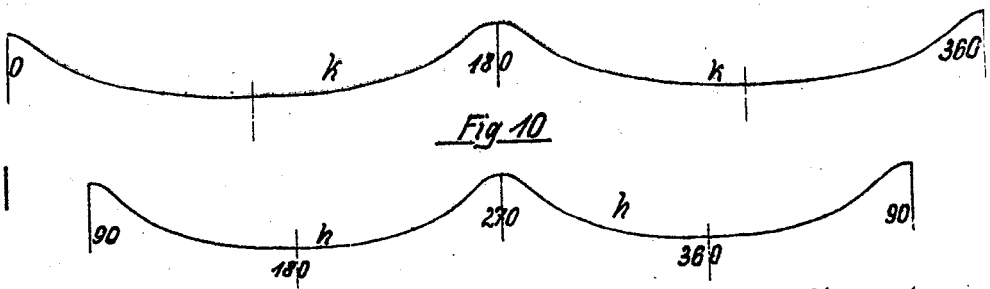
Inventor:
L. Erwin Schubert Feb. 17, 1925. 1,527,086
L. E. SCHUBERT
MEANS OF MEASURING DISTANCES AND ALTITUDES
Filed April 17, 1922  3 Sheets-Sheet 2
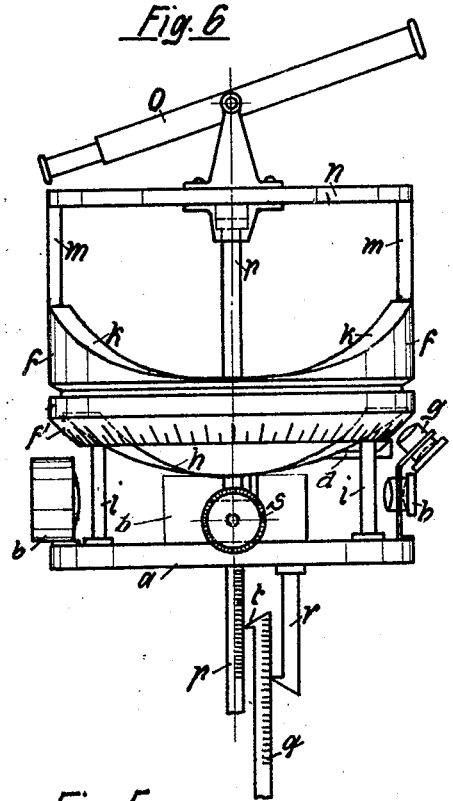
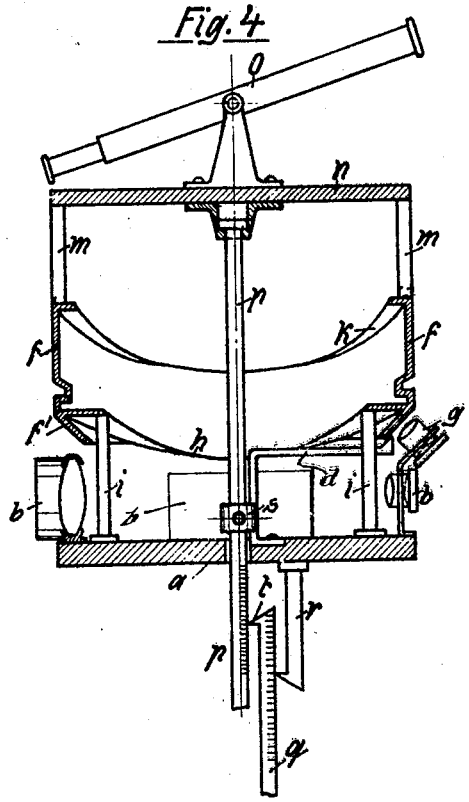
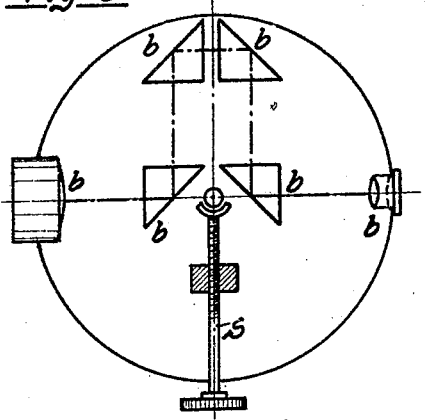
Inventor:
L. Erwin Schubert

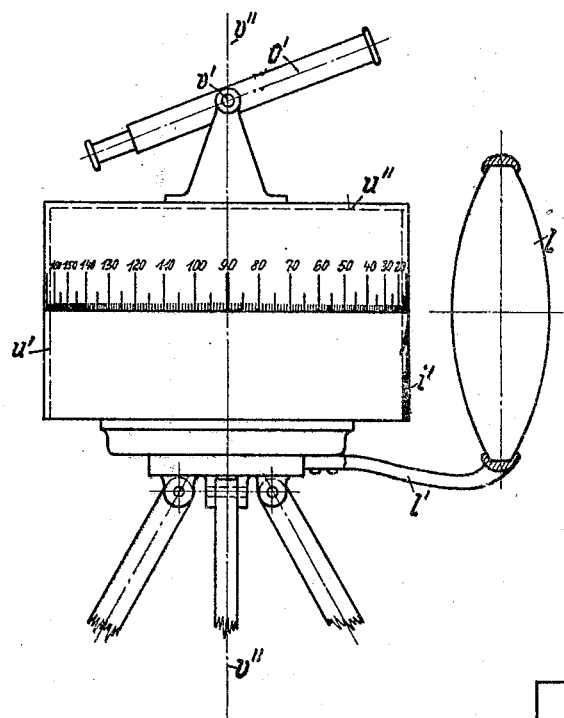
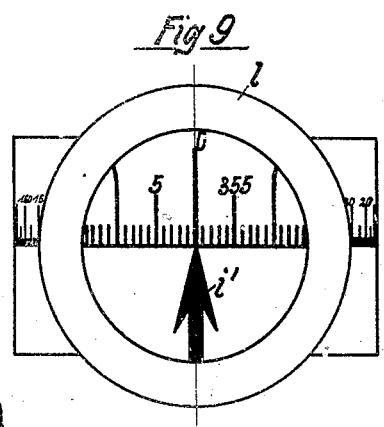
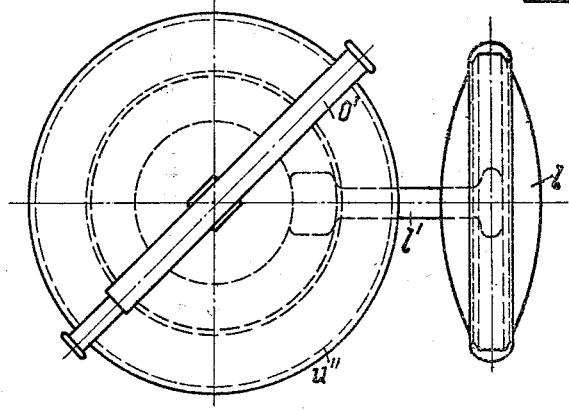

Patented Feb. 17, 1925.

1,527,086

UNITED STATES PATENT OFFICE.

L. ERWIN SCHUBERT, OF BERLIN, GERMANY.

MEANS OF MEASURING DISTANCES AND ALTITUDES.

Application filed April 17, 1922. Serial No. 553,956.

*To all whom it may concern:*

Be it known that I, L. ERWIN SCHUBERT, a citizen of Germany, residing at Berlin, Germany, have invented certain new and useful Improvements in Means of Measuring Distances and Altitudes (for which I have filed an application in Germany on February 22, 1917), of which the following is a specification.

My invention has reference to means of measuring any desired distances and altitudes, and it is one of the important objects of my invention to provide means to be able to read off the value of the distance or altitude directly with the sighting of the aim. In accordance with my invention I make provision for measuring the distances by the employment of two measuring instruments of known distance from each other in accordance with the trigonometric base method usually employed for mensurations in the open, and in the practise of my invention I prefer to proceed by providing a goniometric or angle measuring instrument at either end of the base to be selected, the dividing circle of which is connected with a telescope, and is adapted, upon the sighting of the aim, to be moved past an indicator which is continuously pointed in the direction of the main observing instrument, so as to enable the operator to read off the position of the dividing circle of the other goniometric instrument relatively to such indicator.

My invention will be explained by the aid of the accompanying drawings on which

Fig. 1 illustrates diagrammatically the trigonometric measuring method usually employed.

Figs. 2 and 3 are diagrams to be referred to, illustrating the practising of the new method according to my invention.

Fig. 4 shows a vertical section of a preferred form of construction of an apparatus embodying my invention, and adaptable by way of example for taking measurements according to the new method.

Fig. 5 is a plan view indicating conventionally the relative positions of the operating parts.

Fig. 6 is a side view corresponding to Fig. 4.

Fig. 7 is a similar view of the auxiliary instrument and

Fig. 8 is a plan view thereof.

Fig. 9 is a front view of the magnifying lens shown in Fig. 7.

Fig. 10 is a diagram of curves.

On the principal observation device which may for instance be mounted at the point B of Fig. 1, the angle $\beta$ may be directly read off, and the position of the auxiliary instrument mounted and adjusted by an assistant at A may be read by means of a telescope provided upon the principal instrument so as to be able to determine the angle $\alpha$. Inasmuch as the length of the base $c$ was known before the adjusting of both instruments the distance $BC=a$ may be easily calculated from the formula $$a = c \frac{\sin \alpha}{\sin \gamma}.$$

The calculation work is done by mechanical means in accordance with my invention by the use of a three-sectioned calculating slide one section of which indicates the values of $\log \sin \alpha$, while the other slide contains the values $\log \sin \gamma$, and the third slide section of which is graduated in accordance with the adjustment of the bases $c$.

In a preferred manner of carrying the invention into practise the novel calculating slide is combined with the observation instrument in such a manner that the adjustment of the calculation slide is effected simultaneously with the sighting of the target, so as to enable the distance $a$ to be read off directly upon the principal observation instrument.

The main observing instrument is shown by way of example in Fig. 4 in elevation with parts in section and in Fig. 5 in plan view with parts in section, while Fig. 6 is a side view.

The bottom portion $a$ carries a telescopic system the optical axis of which is adapted to be shifted around the vertical axis of the instrument by the employment of prisms as appears from Fig. 5. The bottom portion $a$ also carries a support for the indicator $d$ in cooperation with the middle section $f$ of the apparatus, the conically shaped edge portion $f'$ of said middle section carrying a scale for the indication of the angles which are shown by the indicator $d$, and may be read off by a lens $g$. This middle section $f$ of the apparatus is provided with a curved bottom portion $h$ which corresponds to the curve log sin $\alpha$ and which rests upon studs $i$ provided upon the bottom section $a$, diametrically opposite each other. The upper portion of the section $f$ is provided with a curve $k$ corresponding to the value of log sin $\gamma$ and adapted to support the studs $m$ of the upper section of the apparatus.

The two curves $k$ and $h$ are illustrated diagrammatically in Fig. 10. In the proximity of the end values 0°, 180° and 360° the curves of the logarithms of the angles $\alpha$ and $\gamma$ owing to their approaching the value infinite become so steep that the gliding of the studs $m$ on the curve $k$ and even the construction of the curve surface $h$ on the cylinder $f$ is rendered impossible. But these end values do not play any rôle in the practical use of the instrument.

The upper section is provided with the telescope $o$. A graduated ruler $p$ is arranged in the vertical axis of the apparatus which projects downwards adjacent the base ruler $q$ which latter is adapted to be moved past the base mark $r$ rigidly secured to the bottom of the lower section $a$ of the instrument. The said three sections $p$, $q$ and $r$ constitute the calculating slide above referred to.

The base ruler $q$ may be secured to the lower section $a$, by means of a clamping device or other suitable means, in such a manner that it may be accurately and undisplaceably adjusted by vertical reciprocation before commencing the measuring operation so as to indicate the value corresponding to the logarithm of the measured base. The adjustment is effected by reading off the value upon the logarithmic graduation of the base ruler $q$ by means of the base mark secured to the bottom part $a$ in the usual manner. The scale ruler $p$ is secured to the top section in a suitable manner, the ruler being arranged for instance in the vertical hollow axle of the apparatus the ruler being thereby adapted to follow every upward and downward movement of the part $n$ of the apparatus, and thereby indicating the sum of the two quantities of movement which are dependent upon the curves $k$ and $h$, by the position of the ruler $p$ relatively to the mark $t$ of the base ruler $q$.

Hence, the procedure is that the mark $r$ is permanently stationary while the base ruler $q$ is adjustable, but after having been adjusted once for the logarithm of the measuring base A—B it remains in this position as long as this measuring base is not changed while the scale ruler $p$ may be moved during the measuring operation in accordance with the value of the logarithms of the particular angular functions.

The abscissæ of the curve $h$ upon the dividing circle correspond to the angular units, while its ordinates correspond to the logarithms of the sines of the corresponding angles. The ordinates, though downwardly graduated operate as positive values in relation to the raising of the measuring device during the sliding movement upon the studs $i$.

The abscissæ of the curve $k$ also correspond to the angular units, while the corresponding ordinates are staggered ninety degrees upon the cylinder with relation to the abscissæ.

The clamp $s$ indicated in Figs. 4, 5 and 6 serves for locking the sections $a$ and $f$ to each other whenever desired.

The procedure in effecting a measurement is as follows:

After having measured the base $c$ (Fig. 1) the auxiliary instrument should be mounted at A and should be horizontally levelled. Then it should be pointed upon B so as to direct the zero point and the indicator in the direction of B. The indicator is then locked in this direction. The principal observation instrument is then mounted at B, horizontally levelled and the zero points of section $a$ and section $f$ (the zero point of the scale $f'$) and made to agree. After having locked the parts $a$ and $f$ to each other by means of the screw $s$ (Fig. 5) the telescope $b$ is directed to the point A. Then, the value of the base $c$ should be marked off by means of the slide ruler $q$. The equation $$a = c \frac{\sin \alpha}{\sin \gamma}$$

will then be solved as follows:—The observer at A points his instrument upon C by aid of the telescope $o'$ (Figs. 7 and 8), and reads the value of the index $v'$ of the drum $u'$ of the auxiliary instrument. The observer at the telescope $b$ reads off the angle $\alpha$: he then observes the indication upon the dividing circle $f$ and makes the adjustment for the angle $\alpha$ (Fig. 2). The curve $h$ (log sin $\alpha$) is turned upon the stud $i$ for the value $\alpha$ and raises parts $f$ and $n$ with the scale ruler $p$ for the value of the log sin $\alpha$. Then the observer at the telescope $c$ points his instrument to the point C so as to turn his directing axis through the angle $\beta$ to the right (Fig. 3), while the zero point of the section $f$ has been turned to the left for the value of the angle $\alpha$. The two optical axes which are determined by the two zero points now form the angle $\alpha + \beta$ from which follows $\gamma = 180 - (\alpha + \beta)$.

The value of the sine is negative in consequence of the position of the curve $k$ (log sin $\gamma$), and the part $f$ with the part $n$ resting thereon including the scale ruler $p$ is lowered and raised for the value of log sin $\gamma$; the position of the mark $t$ upon the scale ruler $p$ will then give the distance $$a = c \frac{\sin \alpha}{\sin \gamma}.$$

The auxiliary instrument at A is illustrated in elevation in Figure 7 and in plan view in Figure 8. It consists of a divided drum $u'$ resting on a tripod and the lower part of which is stationary and carries a visible mark $i'$. The upper part of the drum is arranged to be rotated and bears a graduation from 0—360°. On the upper part $u''$ of the drum the sighting telescope $o'$ is connected by the support $v$ so as to be oscillatable only about its horizontal journals $v'$. It can be turned about the vertical axis $v''$ $v''$ only together with the upper part $u''$. On sighting the point C, the part $u'$ of the drum is rotated to the left through angle $\alpha$. When sighting moving objects, the observer at A constantly follows the object C with the telescope $o'$.

The magnifying lens $l$ facilitates a correct reading of the angle $\alpha$ set at A for the observer at B who sights the graduation of the instrument at A by the telescope system $b'$, the lens serving for magnifying the image of the scale of the drum.

I claim:

1. Device for measuring distances and altitudes, comprising in combination two measuring instruments, sighting means on said instruments, angle measuring scales on said instruments, and means for reading the angular scale of one instrument from the other instrument.

2. In a device for measuring distances and altitudes, two observation instruments; scales for indicating angle values on such instruments, an adjustable section on each instrument, and curved top and bottom portions on said section corresponding to trigonometric values, adjustable scales on the other portion of each instrument corresponding to other trigonometric functions and sighting means on each instrument adapted to be directed to scales of the other instrument and to other distant points.

3. In a device for measuring distances and altitudes in combination, an angle measuring instrument, an angle indicating scale on such instrument, an observation instrument, a pointer on the angle indicating instrument directed to the observation instrument and a telescope on the observation instrument directed to said pointer.

4. In a measuring device in combination, a revolubly shiftable upwardly and downwardly curved member, having a curved bottom corresponding to certain trigonometric functions, and a curved top adapted to correspond to other trigonometric functions, a lower section on which said member is revolubly supported, a substantially circularly arranged, angle-indicating scale on said revoluble member, sighting means on the supporting section, and means on said supporting section for viewing said scale, an upper section freely supported on said revoluble member, a graduated ruler on said upper section adapted to project through the lower section, a graduated slide on said lower section and adjustable relatively to said graduated ruler, said graduated ruler and slide indicating certain trigonometric functions, and means for securing the parts in position.

5. In a measuring instrument in combination, a stationary lower supporting section, an indicator secured to said section, an adjustable ruler on said section adapted to indicate logarithms of a distance serving as a basis, an adjustable curved section supported on the lower section, and an upper section supported on the curved section, and a graduated ruler on said upper section and downwardly extended in engagement with said logarithmic ruler and displaceable during the measuring operation in accordance with the change of the angular measuring constants.

6. In a measuring instrument in combination, three substantially cylindrical, substantially coaxial sections one of which is stationary, there being graduations on one of said sections containing the numbers of certain trigonometric functions, and calculating means operably connected to said sections and supported on said sections for vertical movement in parallel relation to the cylinder-axis and a graduation on said vertically movable means for indicating the logarithms of said numbers.

7. In a measuring instrument in combination, a substantially cylindrical-three-sectioned casing, having a lower relatively stationary section, an intermediate slidably supported upwardly and downwardly arched section on said casing the arched top and bottom of which are curved in accordance with the sine-logarithms of certain measuring angles, and a base indicating, axially supported, downwardly projecting base ruler on said sections, and an indicator on said lower section, adapted for cooperation with said base ruler.

8. In a measuring instrument, in combination, a substantially cylindrical casing in two sections, a lower relatively stationary supporting section on said casing, a revoluble scale on the other section, and an indicator on the stationary section rigidly secured thereto, and cooperating with said scale.

9. In a measuring instrument in combination, a three sectioned casing, a lower relatively stationary supporting section on said casing, a slidably supported upwardly and downwardly arched intermediate section supported thereon, an upper section supported on said intermediate section, a telescope on said upper section, and cooperating curved guides supporting said telescope and operatively connected to said casing, the curvature of said guides being adapted to indicate the logarithm of the tangent of the angle of elevation.

In testimony whereof I affix my signature.

L. ERWIN SCHUBERT.